United States Patent
Pandey

(10) Patent No.: US 9,094,921 B1
(45) Date of Patent: Jul. 28, 2015

(54) DYNAMIC POWER DISTRIBUTION TO REFERENCE SIGNALS IN LTE

(71) Applicant: SPRINT COMMUNICATIONS COMPANY, L.P., Overland Park, KS (US)

(72) Inventor: Chandra Shekhar Pandey, Dayton, OH (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 14/174,217

(22) Filed: Feb. 6, 2014

(51) Int. Cl.
*H04W 40/00* (2009.01)
*H04W 52/24* (2009.01)

(52) U.S. Cl.
CPC .................................. *H04W 52/242* (2013.01)

(58) Field of Classification Search
CPC .............................. H04W 92/02; H04W 36/30
USPC ............... 455/422.1, 450, 434, 444.522, 446; 370/329, 280, 252
See application file for complete search history.

(56) References Cited

U.S. PATENT DOCUMENTS

| | | | |
|---|---|---|---|
| 5,579,373 A | 11/1996 | Jang | |
| 6,765,897 B2 | 7/2004 | Cordier et al. | |
| 6,845,246 B1 | 1/2005 | Steer | |
| 7,085,531 B2 | 8/2006 | Ozluturk | |
| 7,609,661 B2 * | 10/2009 | Chae et al. | 370/310 |
| 8,417,296 B2 | 4/2013 | Caballero et al. | |
| 2011/0009105 A1 | 1/2011 | Lee et al. | |
| 2011/0312368 A1 | 12/2011 | Hamdi et al. | |
| 2013/0029669 A1 * | 1/2013 | Boudreau et al. | 455/444 |
| 2013/0083751 A1 | 4/2013 | Papasakellariou et al. | |
| 2013/0235807 A1 * | 9/2013 | Lee et al. | 370/329 |

FOREIGN PATENT DOCUMENTS

WO      2013127699 A1     9/2013

OTHER PUBLICATIONS

Agilent Technologies, Verify and Visualize Your TD-LTE Beamforming Signals, Application Note, Agilent Technologies, Inc. 2012 Published in USA, Apr. 18, 2012 5990-9997EN, www.agilent.com/find/contactus, 29 pages.

* cited by examiner

*Primary Examiner* — Wayne Cai

(57) ABSTRACT

The invention is directed to methods and systems for calculating an optimal initial reference signal (RS) power channel estimate utilizing coverage area information and path loss information, where the coverage area is divided into an N number of Terrain Zones (TZs), and where each antenna beam available in a given beam matrix of a given cell, can be mapped to a particular coverage area TZ. Consequently, an optimal initial reference signal or pilot signal power is determined at a power distribution component prior to establishing a link on a per beam and TZ basis, thereby improving QoS. The coverage access components in accordance with the present invention may comprise one or more of a BTS, a femtocell, a picocell, etc.

20 Claims, 4 Drawing Sheets

DYNAMIC POWER DISTRIBUTION TO REFERENCE SIGNALS IN LTE

SUMMARY

A high-level overview of various aspects of the invention is provided here for that reason, to provide an overview of the disclosure and to introduce a selection of concepts further described below in the detailed description. This summary is not intended to identify key features or essential features of the claimed subject matter, nor is it intended to be used as an aid in isolation to determine the scope of the claimed subject matter.

In brief and at a high level, this disclosure describes, among other things, methods and systems for dynamically distributing reference signal power for providing the best estimate of channel quality before a link is established during a communications session. By utilizing the systems and methods in accordance with the present invention, an optimal initial reference signal (RS) strength can be calculated for a certain terrain for providing good channel quality prior to establishing the actual link.

The present invention thus, may be used to obtain an optimal initial RS power to be distributed by a power distribution component to the RS channel, without having to use the currently available open loop power control, or otherwise known as non-feedback power control techniques. The open loop power control techniques are disadvantageous because they are not suitable for optimization. In an open loop power control technique, a user equipment (UE) transmitter sets its output power to a specific value, usually between ±9 dB to ±12 dB. The advantages of the present invention over the open loop power control techniques will become more apparent from the Detailed Description.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
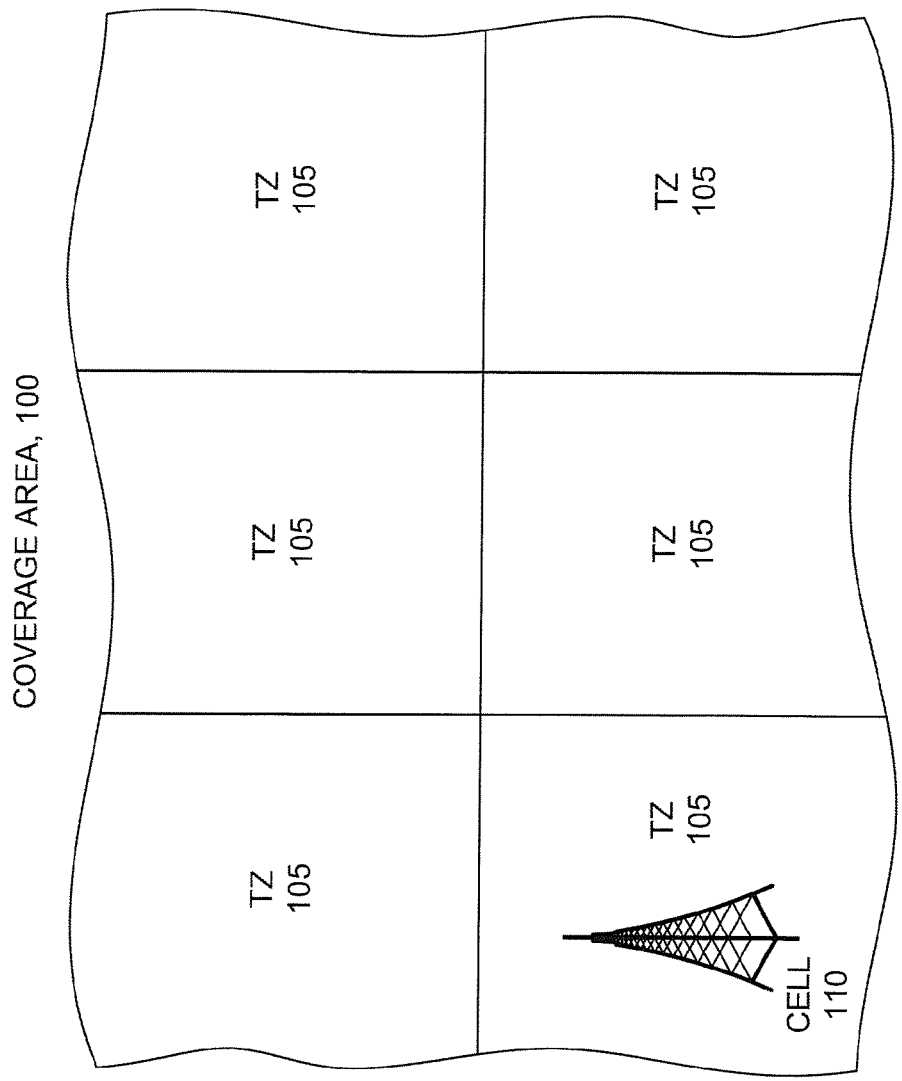
FIG. 1 is a representative view of a coverage area divided into multiple Terrain Zones (TZ)

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention.

Further, various technical terms are used throughout this description. A definition of such terms can be found in, for example, Newton's Telecom Dictionary by H. Newton, 27th Edition (2013). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media may include, but are not limited to, storage devices such as RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently. Computer-storage media does not include carrier waves, modulated data signal, or other communications media.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

As mentioned above, embodiments of the present invention are directed to the initial distribution of power allocated to Reference Signals (RS) prior to establishing a link. Illustrative wireless-telecommunications technologies that may be applicable to the present invention include CDMA, GPRS, TDMA, GSM, and the like (including what is known in the art as Wimax® technology and also Long Term Evolution (LTE)). In some embodiments, the present invention may facilitate other types of wireless communications including Wi-Fi®, Bluetooth® communications, GIS communications, and other near-field communications.

In general, the present invention relates to wireless communications systems in which the initial RS power may be adjusted on a per Terrain Zone (TZ) basis and transmitted on a given antenna-beam basis given an antenna beam matrix. In aspects of the present invention, each beam in a given antenna beam matrix may be dynamically assigned a Reference Signal Channel (RSCH) with an individualized initial power level. The power distribution component in accordance with the present invention may reside at least at a base transceiver station (BTS), eNodeB, picocell, femtocell, UE, etc.

Path loss, which is the measurement of the reduction of power density as a RS travels through space, is an important parameter for determining signal to interference ratio (SINR) and hence quality of service (QoS) in a wireless telecommunications network. Amongst the conditions that may affect path loss are the propagation medium, such as humidity levels in the air, environment, such as urban or rural, the distance between the cell and the UE, terrain contours, etc. There are several statistical methods known in the art for the prediction of path loss. Examples of such statistical methods for path loos predictions may include but are not limited to 3GPP WINNER II, Rice, Hata-Okumura, COST-231, etc. At least one of these methods may be used to calculate and obtain path loss data on a per TZ basis. This data may be stored at a network database or at a database on the cell on which the data was calculated.

Accordingly, the power distribution component in accordance with the present invention may access or derive the path loss data from the appropriate database, which may be created by fine tuning the predicted RS or Pilot signal with the down link and/or the uplink signal level measurements on a per TZ basis, or it may be sent to the power distribution component to be used as an input for calculating an initial RS power. The path loss input based on a per TZ basis is robust and useful for calculating the channel quality in terms of SINR and presents an intelligent algorithm for optimal initial power distribution to the particular RS of RS Channel.

According to aspects of the present invention, the calculated path loss may be used as an input into a power distribution component residing for example at a cell or in the alternative at a user equipment (UE). The power distribution component in accordance with the present invention may be configured to utilize the calculated path loss as input for customization of the initial power level applied to each individual RSCH prior to establishing a communications link. Utilizing statistical data, such as the calculated path loss, as input to the power distribution component, may allow for an optimal initial RS power to be allocated to the RSCH, thereby improving QoS experienced by a user.

According to additional aspects of the present invention, an additional type of input that may be used by the power distribution component, for providing an optimal initial RS power, is coverage area. A coverage area is a geographical area to which services will be provided to subscribers of a particular telecommunications network. A given coverage area may be carefully partitioned into a plurality of Terrain Zones (TZ). The data associated with the plurality of TZ may be parameterized and entered into the power distribution component as input. The parameterized data may be entered manually or it may be automatically communicated to the power distribution component on a per cell basis or on a global basis. Alternatively, at least one list may be created with the parameterized data for real time lookup by the power distribution component. This data may then be used to individualize the coverage for each individual TZ.

In the LTE wireless system, there are different types of RS. Regardless of the type of RS, a RS is usually contained in a given Resource Element (RE). Given the RS, the RS may be mapped to a single port or a multiport antenna array having a certain desired beam matrix. Exemplary matrices that could be used in accordance to aspects of the present invention include for example, the Blass Matrix, the Butler Matrix, etc.

The individualized coverage for each individual TZ may be achieved by, for example, splitting a RS signal contained in a Resource Element (RE) into multiple child RS signals and mapping each child RS signal to each beam in a multiple beam antenna beam matrix. Consequently, each beam in the antenna beam matrix may be tagged to a particular TZ to which the beam may be allocated to serve. Having a beam tagged to a particular TZ in accordance to aspects of the present invention, would allow for a fine Signal to Noise Ratio (SINR) adjustment on a per TZ basis, thereby also allowing for the optimization of the QoS on a per TZ basis.

In a first embodiment of the present invention, a method is provided for calculating an initial power level for a particular beam mapped to a particular TZ. The method includes dividing a given coverage area into a terrain matrix comprised of a plurality of terrain zones. The method may further include assigning a tag or ID to each TZ. Additionally, a weight and an antenna beam may also be assigned to each TZ. The weighting of TZ may be accomplished by for example, considering the importance of any given TZ, landscape, based on the particular population in the given TZ, etc. For example, given a coverage area that is divided into 2 TZs, where the first TZ includes the headquarters of Sprint Corp. and the second TZ includes rural farmland, a higher weight may be assigned to the first TZ rather than the second TZ to indicate that service is required at the first TZ rather than the second TZ, or to indicate that a higher QoS is needed at the first TZ rather than the second TZ. The TZ ID can be randomly or intelligently assigned to each TZ in the coverage area. The TZ ID may be formed of letters or integers, or a combination of both, by a labeling component. The labeling component may reside at the power distribution component, or remotely at the network database, or at a location in proximity with the power distribution component. Further, the method may include calculating an initial power level for each beam, and focusing the beam to the particular TZ to which the beam was assigned to, with the calculated initial RS power level.

In a second embodiment of the present invention, computer-readable media having computer-executable instructions embodied thereon that, when executed, perform a method for calculating an initial power level for a particular beam mapped to a particular TZ. The method includes, processing parameterized terrain partitioning information and entering the information as input to a power distribution component. The parameterized terrain information may include TZ information. The method may further include assigning a tag or ID to each TZ. The TZ ID may be linearly assigned with a numerical value from for example 1 to K, or different algorithms may be used to generate a unique TZ ID for each TZ. Additionally, a weight and an antenna beam may be assigned to each TZ. Further, the method may include calculating an initial power level for each beam, and focusing the beam to the particular TZ to which the beam was assigned to with the calculated initial power level.

In a third embodiment of the present invention, a system may be provided, the system comprising a cell in telecommunications network. The cell may comprise at least an antenna and a power distribution component, wherein the power distribution component is configured to utilize at least TZ data and path loss data for calculating an initial power to a beam that has been assigned to the particular TZ. The path loss data may be calculated or my already exist in the network operator's databases, in various forms. Given the path loss data in each TZ, the initial RS power may be fine tuned at predetermined time intervals, or after a set quantity of links have been established, or every time a new communications link is established in the given TZ.

Initially referring to FIG. 1, an exemplary illustration is provided of a coverage area 100 partitioned into a plurality of Terrain Zones (TZs). The coverage area 100 can be divided into an N number of TZs 105 using high resolution digital terrain maps, such as for example, a digital elevation map (DEM). Utilizing the high resolution digital terrain maps, the coverage area may be divided into the N number of TZs, and the size of the TZs may be chosen according to the granularity desired. For instance, a coverage area may be defined as the White House in Washington, DC, where a high QoS may be desired at every $ft^2$, thus, the White House coverage area may be divided into an N number of TZs that are 1 ft×1 ft. In another example, the coverage area may be defined as for example, the State of Kansas. Then, the coverage area may be divided into TZs that are 30 ft×30 ft, or 100 ft×100 ft, depending on the desired granularity. Additionally, the TZs may be of different shapes other than square, the TZs may be rectangular, trapezoidal, diamond, triangle, or any other shape deemed appropriate for achieving optimal QoS conditions. In other words, the size and shape of each TZ may be adjustable for the particular coverage area in which service will be provided. Once the coverage area is divided into the N number of TZs, a path loss in each TZ may be calculated using tools and prediction algorithms such as 3GPP WINNER II, COST-231, Hata-Okumura, etc. for providing an efficient coverage area map for the services provided by the telecommunications service provider. Therefore, a cell 110 or a plurality of cells 110, each having its own antenna beam matrix, may be strategically placed amongst the TZs 105 such that no TZs 105 are left without network coverage.

As described above, the present invention may be applicable to wireless-telecommunications technologies including CDMA, GPRS, TDMA, GSM, and the like (including what is known in the art as Wimax® technology and also LTE. In some embodiments, the present invention may facilitate other types of wireless communications including Wi-Fi®, Bluetooth® communications, GIS communications, and other near-field communications.

Figure 2:
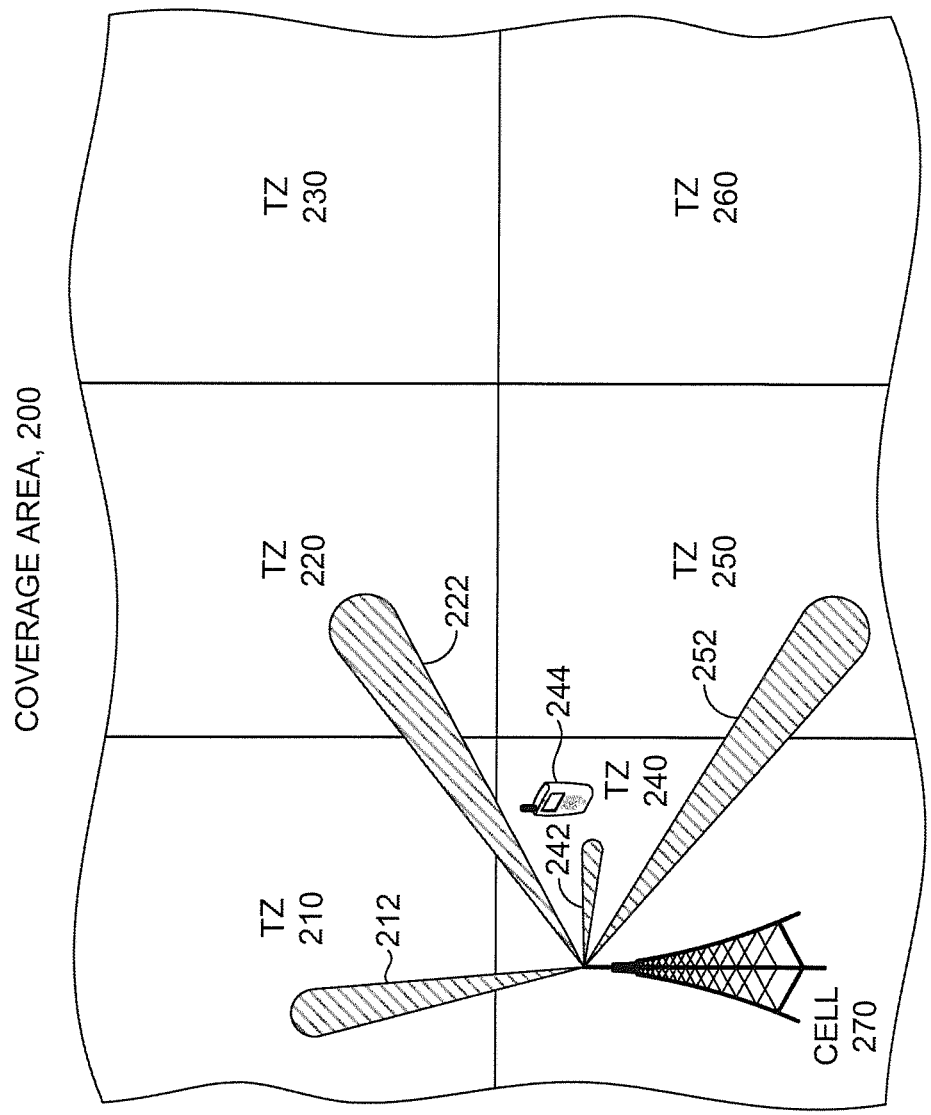
FIG. 2 is a representative view of a coverage area with a cell having beams mapped to individual TZs.

Moving on to FIG. 2, each antenna beam in the antenna beam matrix of a given cell, for example, cell 270, may be mapped to a particular TZ. In the example shown in FIG. 2, cell 270 has a 4×4 beam matrix where four beams are configured for receiving data and four beams are configured to transmit data. For simplification purposes, only the four beams 212, 222, 242, and 252 configured to transmit data are shown. However, the number of beams available in a cell beam matrix may vary greatly as the technology advances. In LTE for example, beam matrices may be 8×8, 16×16, etc. Regardless of the number of beams, the beam matrix may be an input for a power distribution component (not shown) residing in the cell. It is envisioned however, that the power distribution component may also be configured to reside at the UE, provided that the beam forming technology becomes available for UEs.

FIG. 2 shows how once beam matrix information and coverage area information are available to the power distribution component, the antenna beams 212, 222, 242, and 252, may be mapped to respective TZs, for example, beam 212 is mapped to TZ 210, beam 222 is mapped to TZ 220, beam 242 is mapped to TZ 240 and beam 252 is mapped to TZ 250.

Figure 3:
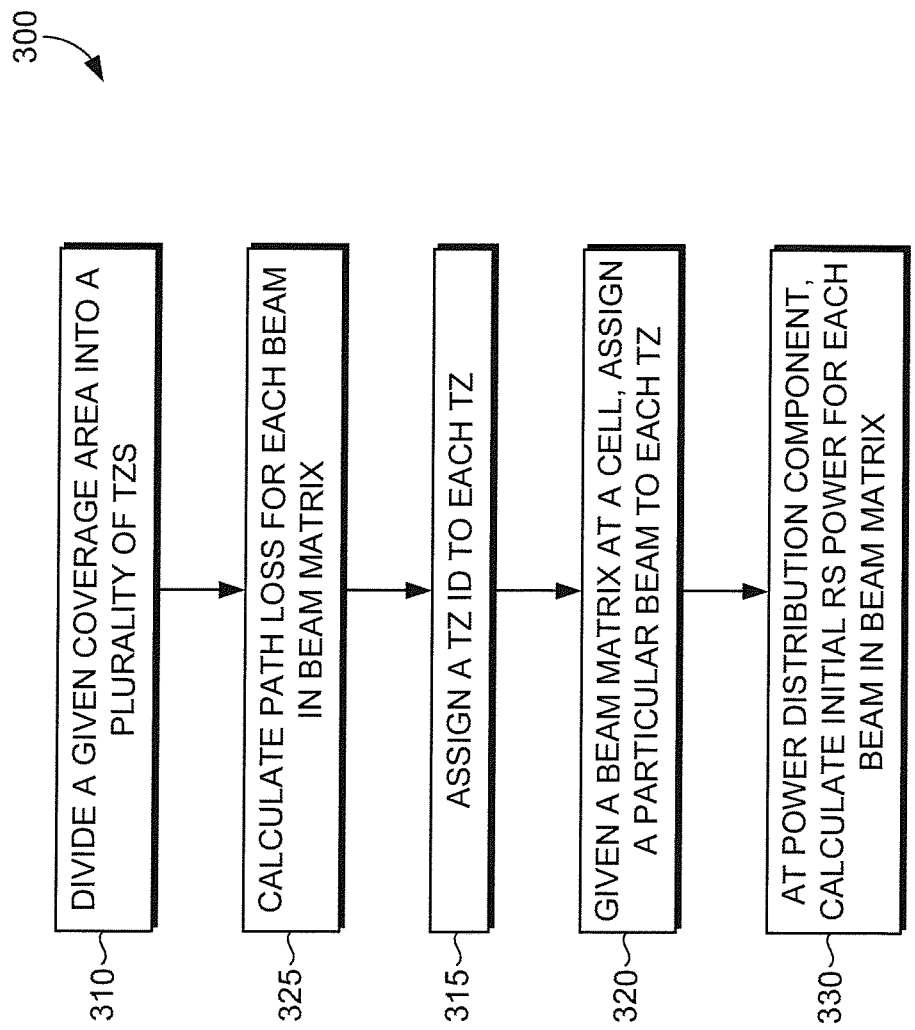
FIG. 3 is a flow diagram outlining the process for providing a link with an optimal initial RS power.

FIG. 3 is a flow chart representing a method 300, in accordance with the present invention. For example, given a coverage area assigned to a particular cell, the coverage area may be divided into a plurality of TZs at step 310 and subsequently, each TZ may be assigned a TZ ID for input into a power distribution component, at step 315. Additionally, given a beam matrix for the particular cell, each beam may be identified and assigned to a particular TZ, as presented in step 320. Once the beams in the beam matrix are mapped to TZs in the coverage area, a path loss may be determined for each beam, as shown at step 325. Given the path loss information for each particular beam, an optimal initial RS power may be determined for each beam prior to establishing a link, as indicated at step 330. Given the optimal initial power is transmitted to each beam, the chances of establishing a secure link can be increased, thereby improving a user's experience.

Figure 4:
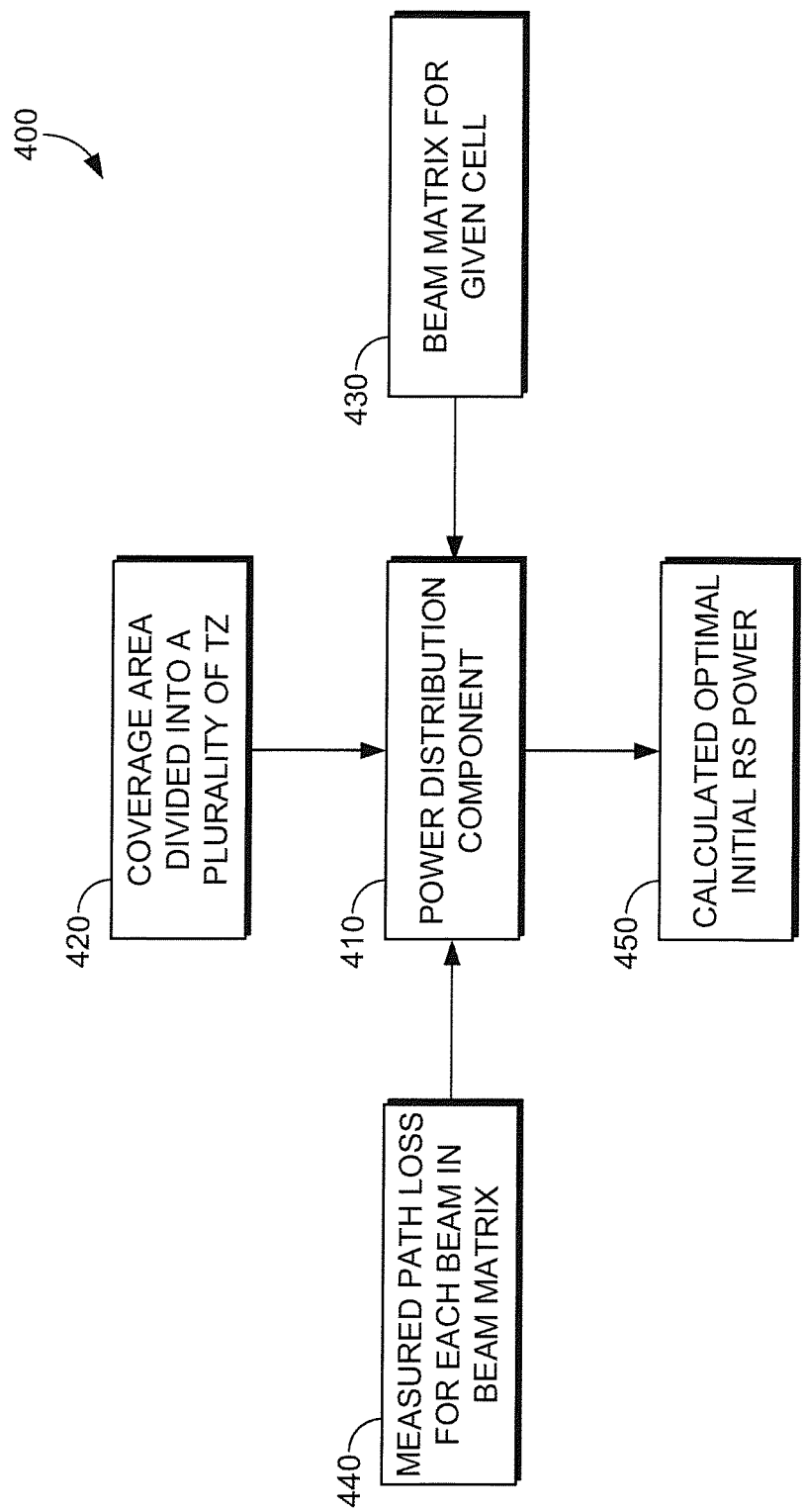
FIG. 4 is are representative diagram illustrating the input parameters utilized for the calculation of the optimal initial RS power prior to establishing a link, in accordance with aspects of the present invention.

Moving on to FIG. 4, a schematic representation 400 of a power distribution component 410 is presented. As discussed above, many different parameters may be used as input into the power distribution component 410, for providing an optimal initial RS power to each managed beam. As an example, the power distribution component may at least receive input parameters related to coverage area information 420, beam matrix information 430, and path loss information 440. The input parameters 420, 430, and 440, may then be used for calculation of an optimal initial RS power needed for establishing an optimal link with an optimal SINR. As such, in accordance to aspects of the present invention, links may be established where a user of a mobile device involved in the link experiences a high QoS, particularly for minimizing events such as connection failures, prior to establishing a communications link and for minimizing instances of dropped connections once a connection has been established and, at the same time, resources are not lost or wasted by providing more power than is actually necessary.

The wireless communications systems in which the power distribution component in accordance with the present invention may reside, may comprise at least a base transceiver station (BTS), eNodeB, picocell, femtocell, UE, etc. As such, antenna beams in an antenna beam matrix may be assigned to particular TZs in a given coverage area covered by the cell in which the power distribution component resides. The power distribution component may use the coverage area information along with the calculated path loss in a given terrain to map each beam in the beam matrix to its assigned TZ with an optimal initial RS power prior to establishing a link. Once the link is established, the power may be dynamically adjusted using real time incoming path loss data to the power distribution component.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more computer storage media having computer executable instructions embodied thereon that when executed by a computing device, cause the computing device to perform a method for distributing an initial reference signal power, the method comprising:

at one or more computer processors:
dividing a given coverage area associated with a cell's antenna beam matrix into a plurality of Terrain Zones (TZ);
determining a path loss for each TZ;
assigning a TZ ID to an individual TZ in the plurality of TZs;
assigning a beam from the cell's antenna beam matrix to the individual TZ using the TZ ID;
at a power distribution component:
calculating an initial reference signal power for the beam using the TZ ID, assignment data for the assigned beam, and the path loss information for the assigned beam, wherein the calculated initial reference signal power is used when establishing a communication link with a user device.

2. The media of claim 1, wherein the cell is a base transceiver station (BTS).

3. The media of claim 1, wherein the cell is a picocell.

4. The media of claim 1, wherein the cell is a femtocell.

5. The media of claim 1, wherein the beam matrix is a 4×4 matrix.

6. The media of claim 1, wherein the beam matrix is an 8×8 matrix.

7. The media of claim 1, wherein the coverage area is divided into an N number of TZ, wherein N is at least 1, and the TZ ID is a unique ID for each TZ.

8. The media of claim 1, wherein the TZ is between 1 ft×1 ft and 30 ft×30 ft.

9. A method for calculating an optimal initial reference signal power prior to establishing a communications link, the method comprising:
dividing a given coverage area associated with a cell into a plurality of Terrain Zones (TZs);
assigning a unique TZ ID to an individual TZ in the plurality of TZs;
inputting TZ ID data into a power distribution component;
assigning a beam in the cell's beam matrix to the individual TZ using the TZ ID;
inputting beam assignment data into the power distribution component;
inputting path loss data for the individual TZ into the power distribution component;
at the power distribution component, calculating the optimal initial reference signal power for the assigned beam utilizing the TZ ID data, the beam assignment data, and the path loss data.

10. The method of claim 9, wherein the cell is a base transceiver station (BTS).

11. The method of claim 9, wherein the cell is a picocell.

12. The method of claim 9, wherein the cell is a femtocell.

13. The method of claim 9, wherein the beam matrix is a 4×4 matrix.

14. The method of claim 9, wherein the beam matrix is an 8×8 matrix.

15. A system for distributing power to a RS, the system comprising:
a cell, the cell further comprising:
an antenna assigned to a coverage area, wherein the antenna comprises a beam matrix, wherein each beam in the beam matrix is assigned to individual Terrain Zones (TZ) of the coverage area; and
a power distribution component, wherein the power distribution component is configured to receive at least a path loss data, a coverage area data and a beam matrix data for the cell, and to calculate an optimal initial RS power for each beam in the beam matrix using the path loss data, the coverage area data, and the beam matrix data.

16. The system of claim 15, wherein the cell is a base transceiver station (BTS).

17. The system of claim 15, wherein the cell is a picocell.

18. The system of claim 15, wherein the cell is a femtocell.

19. The system of claim 15, wherein the coverage area data comprises TZ ID data assigned to each individual TZ.

20. The system of claim 15, wherein the beam matrix data comprises beam assignment information to each TZ.

* * * * *